No. 628,946. Patented July 18, 1899.
J. J. LEFEBER.
WATER WHEEL.
(Application filed Feb. 14, 1899.)
(No Model.) 2 Sheets—Sheet 1.
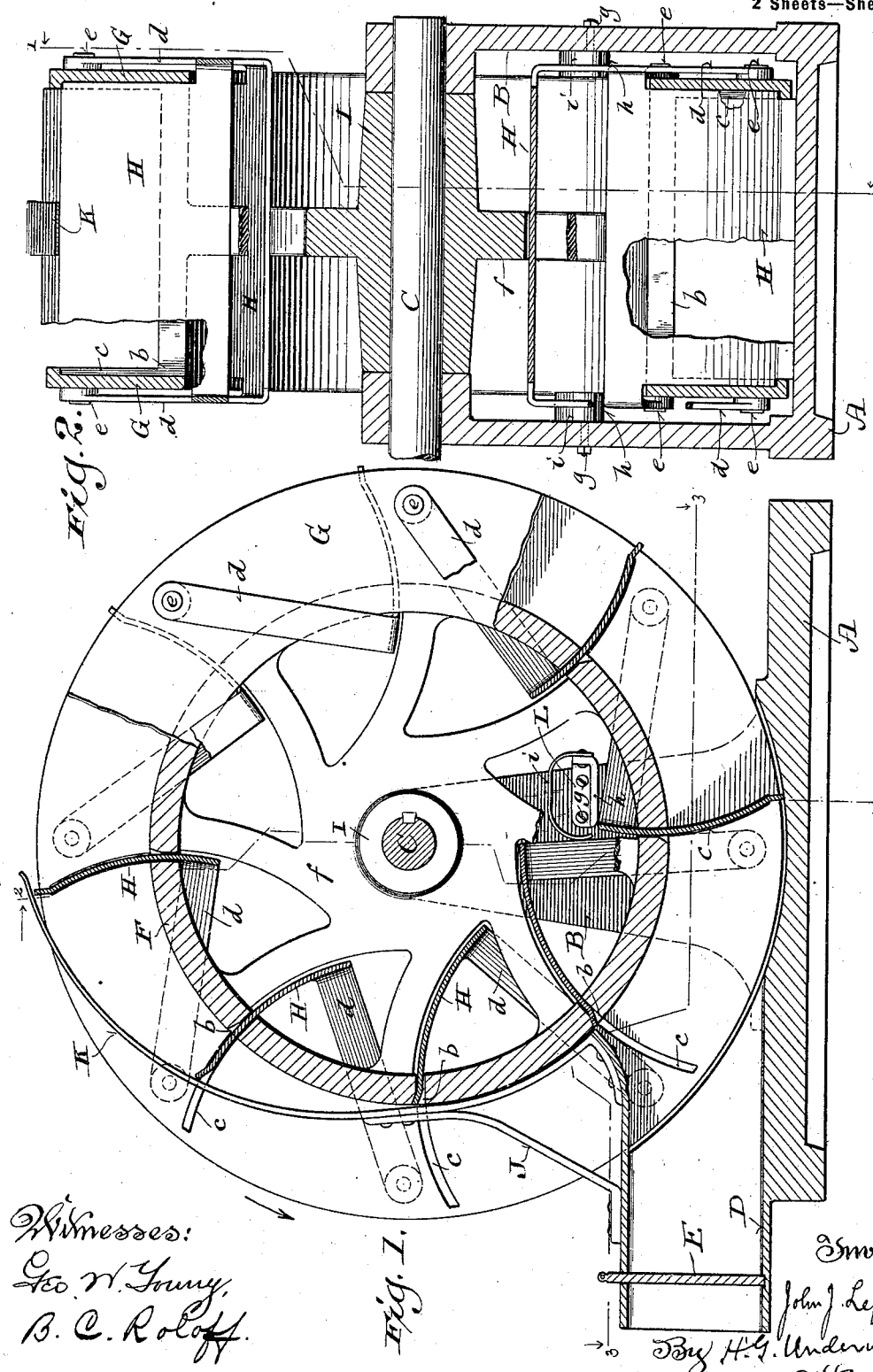

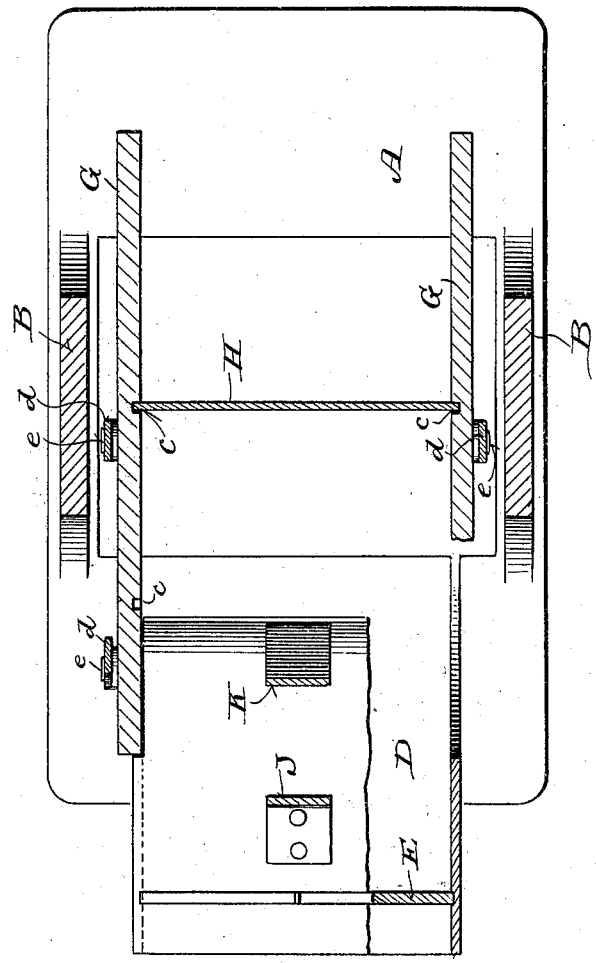

UNITED STATES PATENT OFFICE.

JOHN J. LEFEBER, OF JOHNSBURG, WISCONSIN.

WATER-WHEEL.

SPECIFICATION forming part of Letters Patent No. 628,946, dated July 18, 1899.

Application filed February 14, 1899. Serial No. 705,484. (No model.)

*To all whom it may concern:*

Be it known that I, JOHN J. LEFEBER, a citizen of the United States, and a resident of Johnsburg, in the county of Fond du Lac and State of Wisconsin, have invented certain new and useful Improvements in Water-Wheels; and I do hereby declare that the following is a full, clear, and exact description thereof.

My invention relates to undershot water-wheels; and it consists in certain peculiarities of construction and combination of parts, as will be fully set forth hereinafter and subsequently claimed.

In the drawings, Figure 1 is a view of my improved device, partly in side elevation and partly in section, on the line 1 1 of Fig. 2. Fig. 2 is a vertical sectional view on the line 2 2 of Fig. 1, portions being broken away in both views to better illustrate certain details of construction. Fig. 3 is a horizontal sectional view on the line 3 3 of Fig. 1.

Referring to the drawings, A represents the base or platform of the wheel, and B B the standards rising therefrom, which support the axle C of the wheel.

D is the chute, which delivers the water to the wheel, said chute being provided with a proper water-gate E to cut off the supply of water when desired.

F designates the periphery of the wheel, and G G the annular flanges thereof, said periphery having slots $b$ $b$ therethrough and said flanges coinciding grooves $c$ $c$ in the opposed inner faces thereof for the reception and passage of the curved blades H H, which are provided with straps $d$ $d$, hinged to the outer surfaces of the wheel-flanges G G, as shown at $e$ $e$.

I represents the hub of the wheel, keyed or otherwise suitably secured to the axle C and connected to the periphery F by a suitably-arranged web $f$, cut out, as shown, to afford space for the proper movement of the said blades H H. As the wheel is revolved the blades which are uppermost drop by gravity, aided by the curved spring K, which is secured to and rises from the top of the chute D adjacent to the wheel, said spring being further supported by the brace J, secured to it and to the said chute.

L L represent plates secured to the inner surfaces of the standards B B, as by screws or bolts $g$ $g$, said plates having inwardly-extending lower bearing-surfaces $h$ $h$ and upwardly and rearwardly extending springs $i$ $i$, said springs and bearing-surfaces coming in the path of the advancing blades H H and forcing and holding them out from the center, so as to close the passage between the flanges G G of the wheel as the said blades successively reach this point, to again drop inward toward the center as said blades successively rise to the uppermost point of the wheel, where they again encounter the spring K.

The operation of my water-wheel will be plainly understood from the foregoing description, taken in connection with the accompanying drawings. It is necessary that the blades H should fall in toward the center as they approach the chute, so that there may be an unobstructed passage for the stream of water therefrom through the channel formed by the wheel-flanges G G, and this, as stated, is accomplished by gravity and aided and rendered positive by the action of the spring K.
It is equally necessary that the said blades H should be forced outward from the center as they reach the lowest point in the revolution of the wheel in order to close said passage and form a barrier to the progress of said stream of water from the chute, and the springs $i$ $i$ by contact with the straps $d$ $d$ of the next advancing blade H begin this closing operation, which is finished by the bearing-surfaces $h$ $h$ of the plates L L as the wheel is forced onward, the action of the said springs $i$ $i$ preventing binding and injury in the initial step of the closing process and greatly facilitating said operation.

Having thus described my invention, what I claim as new, and desire to secure by Letters Patent, is—

1. In a water-wheel, the combination with a chute and a suitably-supported wheel adjacent thereto, provided with annular wheel-flanges having grooves therein coinciding with slots through the periphery of the wheel, of a series of blades moving in said grooves and through said slots, straps pivotally secured to said flanges and rigidly secured to said blades, and devices in the path of said blades to force them outward from the center and close the passage between the wheel-flanges, at the proper time, substantially as set forth.

2. In a water-wheel, the combination with a chute and a suitably-supported wheel adjacent thereto, provided with annular wheel-flanges having grooves therein coinciding with slots through the periphery of the wheel, of a series of blades moving in said grooves and through said slots, straps pivotally secured to said flanges and rigidly secured to said blades, and a spring arranged to encounter said blades in the revolution of the wheel and force said blades inward toward the center of the wheel and open the passage between the wheel-flanges as said blades approach the chute, substantially as set forth.

3. In a water-wheel, the combination with a suitably-supported wheel having a transversely-slotted periphery and annular flanges with grooves therein coinciding with said slots, of a series of blades adapted to move in said grooves and through said slots, straps pivoted to said flanges and secured to said blades, and yielding devices for outwardly moving said blades, and having bearing-surfaces for holding the blades in such outward position away from the center of the wheel, substantially as set forth.

4. In a water-wheel, the combination with a suitably-supported wheel having a transversely-slotted periphery and annular flanges with grooves therein coinciding with said slots, of a series of blades adapted to move in said grooves and through said slots, straps pivoted to said flanges and secured to said blades, a spring for forcing said blades inward toward the center of the wheel, and a device for forcing the blades outward from the center and between the flanges, and for holding them in such position, substantially as set forth.

In testimony that I claim the foregoing I have hereunto set my hand, at Calvary, in the county of Fond du Lac and State of Wisconsin, in the presence of two witnesses.

JOHN J. LEFEBER.

Witnesses:
  JOHN L. BEAN,
  OTTO J. BEAN.